United States Patent [19]

Speybroeck

[11] Patent Number: 5,417,402

[45] Date of Patent: May 23, 1995

[54] SHUTOFF AND PRESSURE REGULATING VALVE

[75] Inventor: John R. Speybroeck, South Bend, Ind.

[73] Assignee: AlliedSignal Inc., Morristown, N.J.

[21] Appl. No.: 194,673

[22] Filed: Feb. 10, 1994

[51] Int. Cl.[6] .......................................... F16K 31/122
[52] U.S. Cl. .................... 251/30.01; 251/33; 251/43
[58] Field of Search ............... 251/30.01, 30.03, 30.02, 251/33, 43, 38, 39

[56] References Cited

U.S. PATENT DOCUMENTS

| | | | |
|---|---|---|---|
| 3,114,532 | 12/1963 | Gray et al. | 251/30 |
| 3,424,427 | 1/1969 | Ruchser | 251/30.02 |
| 3,477,466 | 11/1969 | Sturm | 251/30.02 X |
| 4,876,857 | 10/1989 | Feltz et al. | 137/538 X |

Primary Examiner—Stephen M. Hepperle
Assistant Examiner—Kevin L. Lee
Attorney, Agent, or Firm—Leo H. McCormick, Jr.; Larry J. Palguta

[57] ABSTRACT

A fluid pressure control apparatus having a main valve and a pilot valve for moving the main valve to a shutoff position as a function of the fluid pressure in a supply fluid. The pilot valve is connected to receive supply fluid having a fluid pressure Ps through a first passage. A second passage connected to the first passage communicates supply fluid to a control chamber in the main valve. A first restriction in the second passage limits the fluid pressure of the supply fluid communicated to the control chamber to a fluid pressure Pc. The control chamber is connected to a reservoir having a fluid pressure Pr through a third passage having a second restriction therein to control the flow of fluid from the control chamber. A first piston located in the main valve is responsive to a pressure differential between the fluid in the control chamber and supply fluid presented to an outlet chamber to control the flow of supply fluid as a fluid pressure Pc to a system from the main valve. In response to an operational input signal supplied to a solenoid associated with the pilot valve, a second piston moves to initiate communication of supply fluid having a fluid pressure Ps from the first passage directly to the control chamber in the main valve. As the fluid pressure in the control chamber changes from Pc to Ps, the pressure differential is eliminated and the first piston closes as a force differential is reversed to immediately terminate the flow of supply fluid to the system.

7 Claims, 2 Drawing Sheets

SHUTOFF AND PRESSURE REGULATING VALVE

This invention relates to a fluid pressure control apparatus having a main valve and a solenoid operated pilot valve for allowing supply fluid to flow to a system and for shutting off the flow as such fluid to the system in response to the fluid pressure in the supply fluid.

BACKGROUND OF THE INVENTION

In fuel systems for use in supplying a turbine engine in an aircraft with fuel it is important to immediately terminate the flow the flow of fuel when the engine is to be shut down or if an overspeed operational condition occurs. U.S. Pat. No. 4,876,857 discloses a shut off and pressure regulator valve which includes a sealing arrangement which prevents the flow of fuel to the system when a desired shut down occurs. In some applications where the supply pressure is large, it may be desirable to use a larger main valve and a smaller solenoid operated pilot valve to rapidly provide for such shut down. U.S. Pat. No. 3,114,532 discloses a such pilot valve which is carried by the main valve. In this control valve, considerable manufacturing effort is required to locate the solenoid valve in the main valve and even though it operates in a satisfactory manner, customers desire a lower cost control valve which functions in a similar manner. Further, in this control valve since the closure pressure is developed by sealing a sump port, the closure time is a direct function of the time required to build up the closure pressure in the main valve.

SUMMARY OF THE INVENTION

In the present invention, a solenoid operated pilot valve is remotely located from a main valve to control the communication of a supply fluid to a control chamber through which a closure force acts on and moves a piston to terminate the flow of supply fluid to a system. The pilot valve which includes a solenoid connected to a system ECU is activated to communicate supply fluid to the main valve which acts on anti moves a first piston to a closure position for immediately interrupting communication of supply fluid to the system. The flow of supply fluid from the main valve is a function of a force differential created across the first piston between a control fluid pressure Pc in a control chamber and supply fluid pressure Ps in a supply chamber in the main valve. The supply fluid pressure Ps is simultaneously communicated through a supply conduit to the main valve and a first passage in a housing to the pilot valve. A second passage in The housing connects the first passage to the control chamber in the main valve in order to provide for the supply fluid Ps to bypass the pilot valve. A first restriction in the second passage restricts the flow of the supply fluid Ps such that the fluid pressure that is presented to the control chamber is Pc. A third passage in the main valve connects the control chamber with a relief port connected to a reservoir, the fluid pressure in the reservoir is Pr. A second restriction located in the third passage controls the flow of fluid from control chamber through the relief port. The first and second restrictions have substantially equal effective areas such that the fluid pressure $Pc=(Ps+Pr)/2$. A fourth passage connects the pilot valve with the second passage downstream from the first restriction. A spring in the housing of the pilot valve urges a second piston toward a seat to prevent communication of the supply fluid Ps from a first chamber through the fourth passage. The second piston has a restricted passage through which the supply fluid Ps is communicated into a closure chamber in the housing. The second piston has a larger effective area in the second chamber as a result the supply fluid Ps acts on the larger effective area to assist in holding the second piston against the seat to prevent communication from The first chamber. When it is determined that communication of supply fluid should be terminated to the system, an input from the ECU activates the solenoid in the pilot valve and dumps supply fluid Ps from the second chamber to allow the supply fluid in the first chamber to create an actuation pressure differential which acts on and moves the second piston away from the seat to allow supply fluid Ps to directly flow to the control chamber by way of the second and fourth passages. The supply fluid Ps in the control chamber acts on and moves the first piston toward the supply chamber to immediately terminate the flow of supply fluid to the system.

It is an object of this invention to provide a fluid pressure control apparatus with a main valve wherein the fluid pressure of a supply fluid acts on and holds a regulator piston in an opened position as a function of supply fluid pressure and a control pressure Pc where Pc is equal to $(Ps+Pr)/2$ with Pr being reservoir pressure.

An advantage of this invention resides in a system wherein a control pressure derived as a function of a pressure drop produced in the fluid pressure of supply fluid flowing through first and second restrictions to establish a pressure differential with the supply pressure acting on a piston to control the flow of supply fluid to a system and a solenoid operated pilot valve responsive to a shut off signal from a ECU which allows the supply fluid to bypass the first restriction and immediately dissipate the control pressure and act on the piston to immediately terminate the flow of supply fluid to the system.

DETAILED DESCRIPTION OF THE INVENTION

Figure 1:
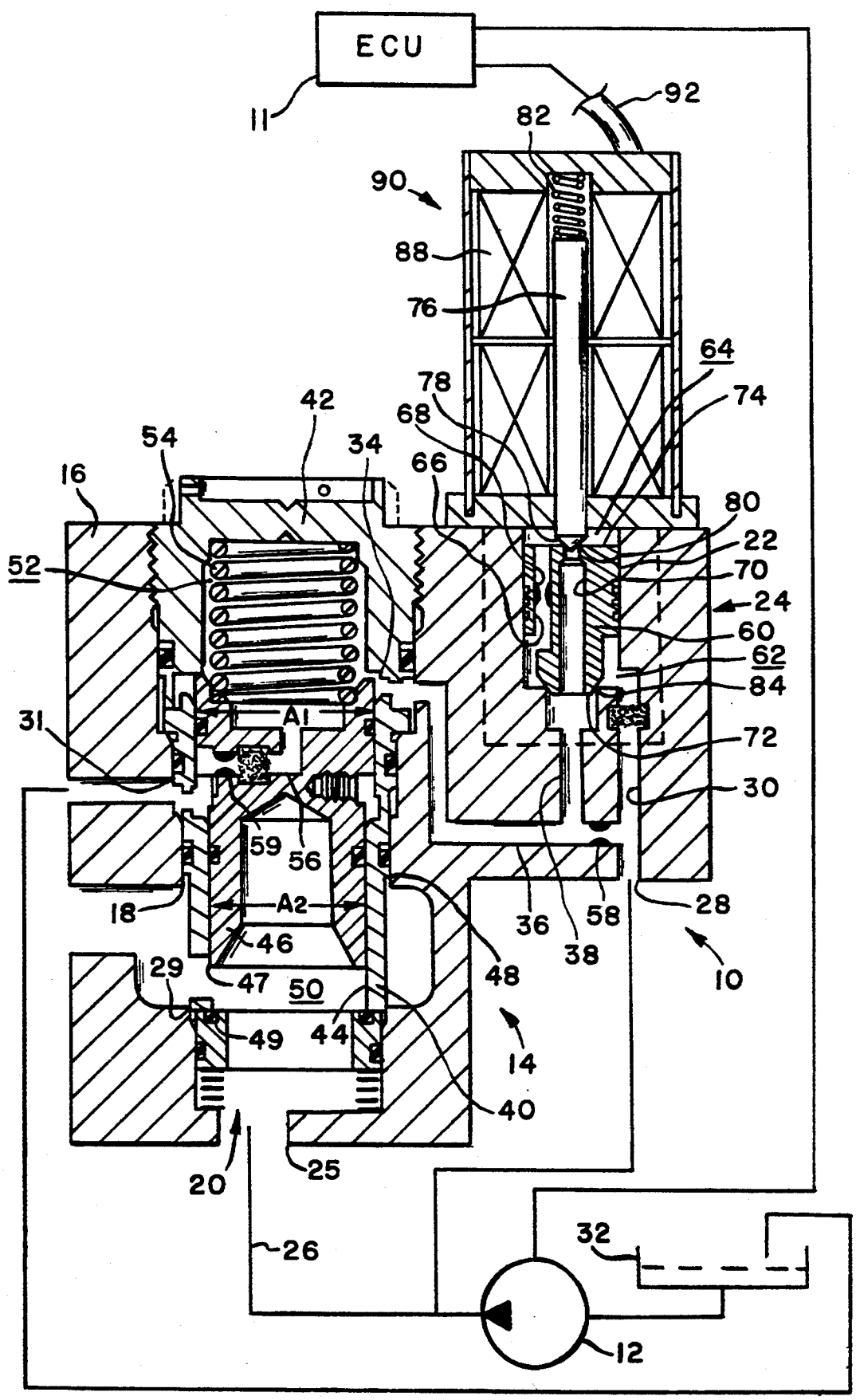
FIG. 1 is a schematic illustration of a fuel control apparatus made according to the present invention through which fluid is supplied to a system.

The fuel supply system 10 shown in a pump 12 for delivering a supply fluid with a fluid pressure Ps to a fluid pressure control apparatus 14 through which fluid is supplied to the system for distribution to a turbine.

The fluid pressure control apparatus 14 has a housing 16 with a main bore 18 located therein for retention of a main valve 20 and a pilot bore 22 for retention of a pilot valve 24. The main bore 18 has a port 25 which is connected by conduit 26 to receive supply fluid from pump 12 and the pilot bore 24 has a port 28 connected by passage 30 to receive supply fluid from pump 12. In addition, the main bore 18 has a port 29 through which metered fluid is communicated to the system, a port 31 which is connected to a reservoir 32 for the pump 12 and a port 34 connected by passage 36 to passage 30 while the pilot bore 22 has a passage 38 connected to passage 36. A sleeve 40 located in the main bore 18 by end cap 42 has a smooth inner surface 44 which is mated with piston 46 and a peripheral surface 48 which engages the housing 16. Piston 46 engages sleeve 40 to define a supply chamber 50 and a control chamber 52 within housing 16 of the main valve 20. A spring 54 located in the control chamber 52 acts on and urges piston 46 toward the supply chamber 50. Piston 46 has a first effective area $A_1$ located in the control chamber 52 and a second effective area $A_2$ located in the supply chamber 50. Passage 36 has a restriction 58 located therein while piston 46 has an internal passage 56 with a restriction 59 located therein to control the flow of supply fluid to reservoir 32. Restrictions 58 and 59 are identical in size such that the pressure drop in the supply fluid for the fluid supplied to the control chamber 52 can be calculated according to the following formula: $Pc=(Ps+Pr)/2$.

The pilot valve 24 has a piston 60 which is located in pilot bore 22 bore to separate a first chamber 62 from a second chamber 64. Passages 30 and 38 are connected to the first chamber 62 while piston 60 has a passage 66 with a restriction 68 therein through which the first chamber 62 is connected to the second chamber 64. In addition piston 60 has an axial bore 70 which extends from a first face 72 to a second face 74. A stem or plunger 76 which extends into chamber 64 has a conical face 78 that is urged toward a seat 80 on piston 60 by a spring 82 to seal bore 70 and to engage face 72 on seat 84 on housing 16 to prevent communication from the second chamber 64 into passage 38. A coil 88 of the solenoid 90 which surrounds stem or plunger 76 is connected by leads 92 to the ECU of the system.

MODE OF OPERATION

In response to an operator input, ECU 11 supplies a signal to activate pump 12 which thereafter pressurizes fluid from reservoir 32 having a fluid pressure Pr to a fluid pressure Ps. The supply fluid is simultaneously supplied to supply chamber 50 in the main valve 20 and the first chamber 62 in the pilot valve 24. The supply fluid present in passage 30 is communicated through restriction 58 into passage 36 to the control chamber 52 and to the reservoir 32 to develop fluid pressure Pc in the control chamber 52. With supply fluid in the supply chamber 50 having a fluid pressure Ps and control fluid in the control chamber 52 having a fluid pressure Pc, a pressure differential is created across piston 46. The supply fluid pressure Ps acts on the effective area $A_2$ while the control fluid pressure Pc acts on $A_1$ and when the force developed by $PsA_2$ is sufficient to overcome the force developed by $PcA_1$ plus the force of spring 54, piston 46 moves toward the control chamber 52 to allow supply fluid to flow at a rate corresponding to the size of the opening that is uncovered in port 29 by end 47 in a manner as illustrated in FIG. 1. During this operation, the pilot valve 24 is inoperative as a force difference produced by supply fluid pressure Ps acting on face 74 and face 72 and the force of spring 82 acting through plunger 76 holds face 72 on piston 60 against seat 84 to assure that the supply fluid presented to the control chamber 52 occurs through the restriction 58 in passage 36. The flow of supply fluid to the system at a pressure of Po continues as a function of the pressure differential Ps−Pc acting on their respective effective areas of piston 46 in accordance with the operational signal developed in the ECU.

Figure 2:
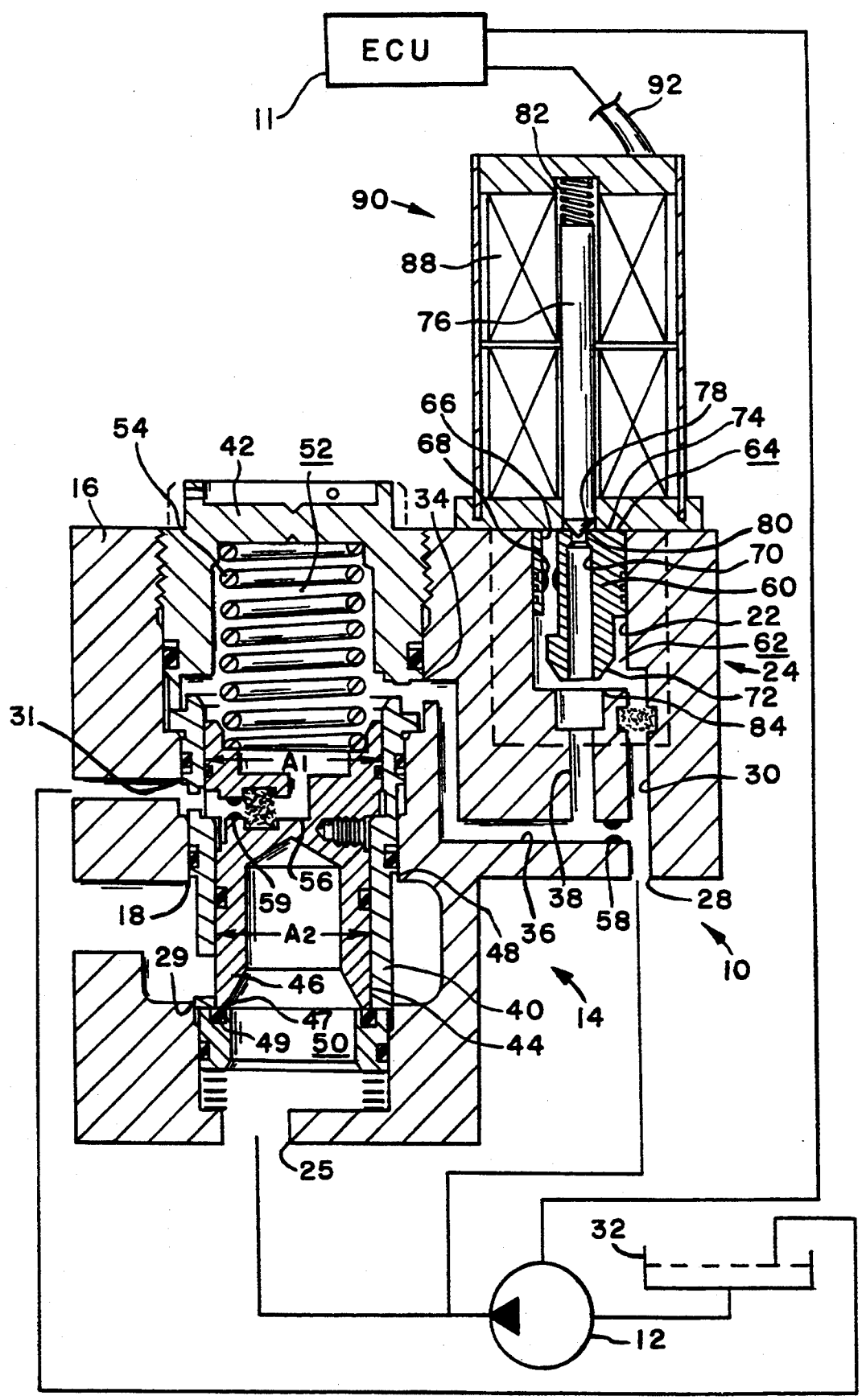
FIG. 2 is a schematic illustration of the fuel control apparatus of FIG. 1 when fluid flow is terminated to the system.

When it is desired to terminate the flow of supply fluid to the system, a signal from the ECU is supplied to coil 88 of solenoid 90 to generate a force field which acts on plunger 76 and after overcoming spring 82 moves conical face 78 away from seat 80 to dump supply fluid from chamber 64 into axial bore 70 and reduce the fluid pressure therein essentially to Pc. With a reaction in the fluid pressure in chamber 64, the supply fluid pressure in chamber 62 act on face 72 to move piston 60 toward chamber 64 and communicated supply fluid directly to control chamber 52 bypassing restriction 58. The supply fluid in chamber 52 now has a fluid pressure Ps and since $A_1$ is larger than $A_2$ piston 46 is immediately moved to the closure position shown in FIG. 2 to terminate the flow of supply fluid from chamber 50 through port 29 as end 47 engages seal 49. Thus, the termination of the flow of supply fluid to the system occurs in a relative short period of time once the ECU provides a signal to shut down a turbine or anything controlled by the fluid pressure in the system.

I claim:

1. A fluid pressure control apparatus having a housing with a bore, first piston means located in said bore and with said housing defining a control chamber and a supply chamber, said housing having a first inlet port through which said supply chamber is connected to a source of supply fluid having a fluid pressure Ps, an outlet port through which said supply chamber is connected to a system, a control port through which said control chamber is connected to a pilot valve responsive to an operational signal for supplying supply fluid to said control chamber, and a relief port through which said control chamber is connected to a reservoir, said reservoir having a fluid pressure Pr, said first piston means being responsive to an operational pressure differential created between a fluid pressure Pc in said control chamber and the supply fluid pressure Ps in said supply fluid in said supply chamber by moving to sequentially open said outlet port and allow said supply fluid to flow to said system from said supply chamber with a fluid pressure Po, the improvement in said apparatus comprising: first passage means for connecting said pilot valve to said source of supply fluid, second passage means for connecting said control chamber with said first passage means upstream of said pilot valve, third passage means for connecting said control chamber with said relief port, a first restriction located in said second passage means for allowing supply fluid to flow from said first passage means toward said control chamber by bypassing said pilot valve and a second restriction located in said third passage means to allow fluid to flow from said control chamber to said relief port, said first and second restrictions having substantially equal effective areas such that said fluid pressure in said control chamber is defined by the following relationship $Pc=(Ps+Pr)/2$ to control the flow of supply fluid through said outlet port to said system.

2. The fluid pressure control apparatus as recited in claim 1 wherein said housing includes:
a second supply chamber connected to said first passage means for receiving said supply fluid having a fluid pressure Ps and fourth passage means connected to said second passage means; and said pilot valve includes:
stem means located in said second supply chamber; and
spring means for urging said stem means toward a seat in said housing to prevent communication of supply fluid from said second supply chamber through said fourth passage means such that communication of supply fluid from said first passage means to said second passage means normally occurs through said first restriction.

3. The fluid pressure control apparatus as recited in claim 2 wherein said stem means includes:
a second piston located in said housing for separating said second supply chamber into a first chamber and a second chamber, said first chamber being connected to said first passage means, said second piston having an internal passage therein through which said first chamber is connected to said second chamber, said second piston having a first face in said first chamber and a second face in said second chamber; said second face having a larger effective area that said first face such that said supply fluid pressure Ps acts on and urges said first face on said second piston toward said seat to seal said first chamber from said fourth passage means.

4. The fluid pressure control apparatus as recited in claim 3 wherein said second piston further includes:
an axial opening that extends from said first face to said second face through which supply fluid from said second chamber is selectively communicated to said fourth passage means to initially reduce said fluid pressure in said second chamber.

5. The fluid pressure control apparatus as recited in claim 4 wherein said pilot valve further includes:
spring means for urging said stem means into engagement with said second piston to seal said axial opening and prevent communication of said supply fluid from said second chamber; and
solenoid means connected to an electronic controller, said stem means forming a part of said solenoid means, said solenoid means being responsive to a signal from said electronic controller for moving said stem means after overcoming said spring means to allow supply fluid to flow through said axial opening and initially reduce the fluid pressure in said second chamber and thereafter allow said supply pressure Ps in said first chamber to act on said first face and move said second piston away from said seat and thereafter allow supply fluid Ps to flow from said first chamber to said control chamber by way of said fourth passage means and said second passage means, said supply fluid Ps on being presented to said control chamber dissipating said operational pressure differential acting on said first piston as the fluid pressure Ps replaces the fluid pressure Pc, said supply fluid Ps acting on and moving said first piston means to close said outlet port from said supply chamber and terminate the flow of supply fluid to said system.

6. The fluid pressure control apparatus as recited in claim 5 wherein said apparatus further includes:
a second spring located in said control chamber for urging said first piston means toward said supply chamber to assure that flow of said supply fluid from the supply chamber terminates when the fluid pressure Pc is replaced with fluid pressure Ps.

7. The fluid pressure control apparatus as recited in claim 6 wherein said communication between said control chamber and said relief port occurs through an internal passage in said first piston means.

* * * * *